No. 784,705. PATENTED MAR. 14, 1905.
E. J. RECTOR.
REVERSING DRIVING MECHANISM.
APPLICATION FILED SEPT. 26, 1902. RENEWED JUNE 10, 1904.
2 SHEETS—SHEET 1.
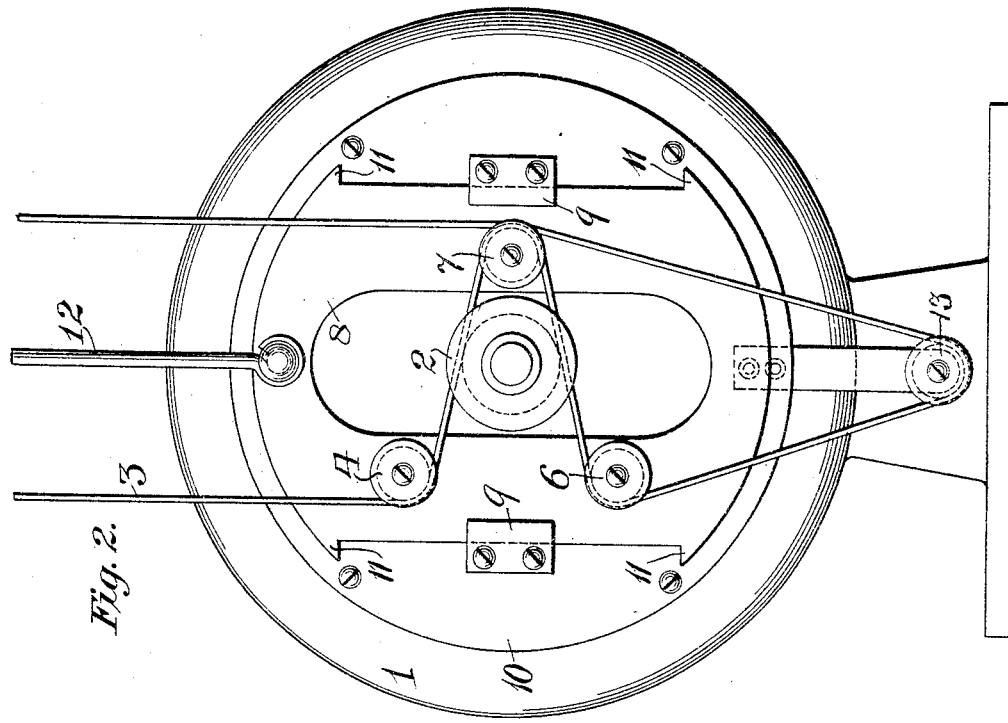
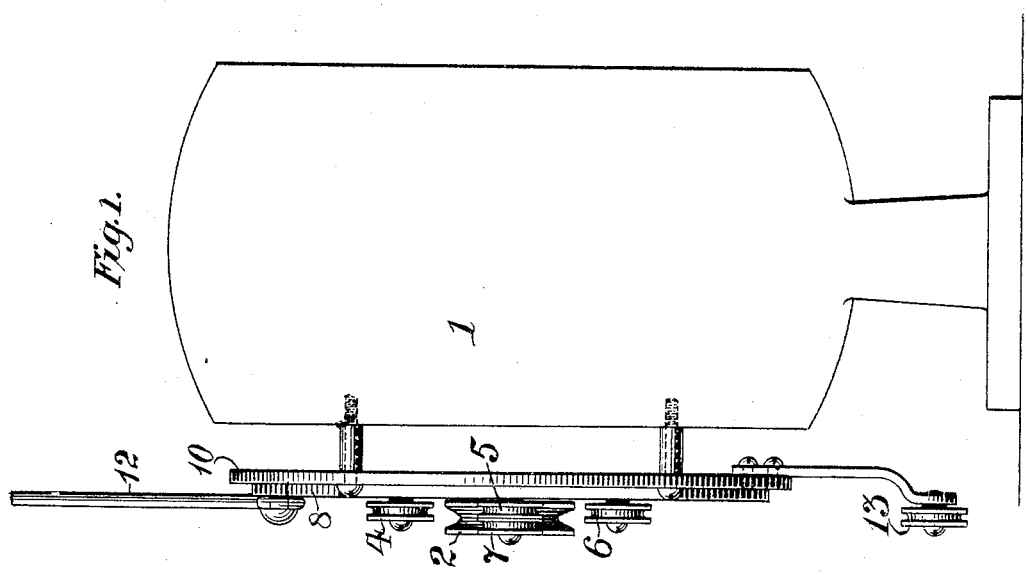
WITNESSES:
C. E. Ashley
Gus. C. Henning
INVENTOR
Enoch J. Rector,
By his Attorney,
Richard W. Barkley.

No. 784,705. PATENTED MAR. 14, 1905.
E. J. RECTOR.
REVERSING DRIVING MECHANISM.
APPLICATION FILED SEPT. 26, 1902. RENEWED JUNE 10, 1904.
2 SHEETS—SHEET 2.
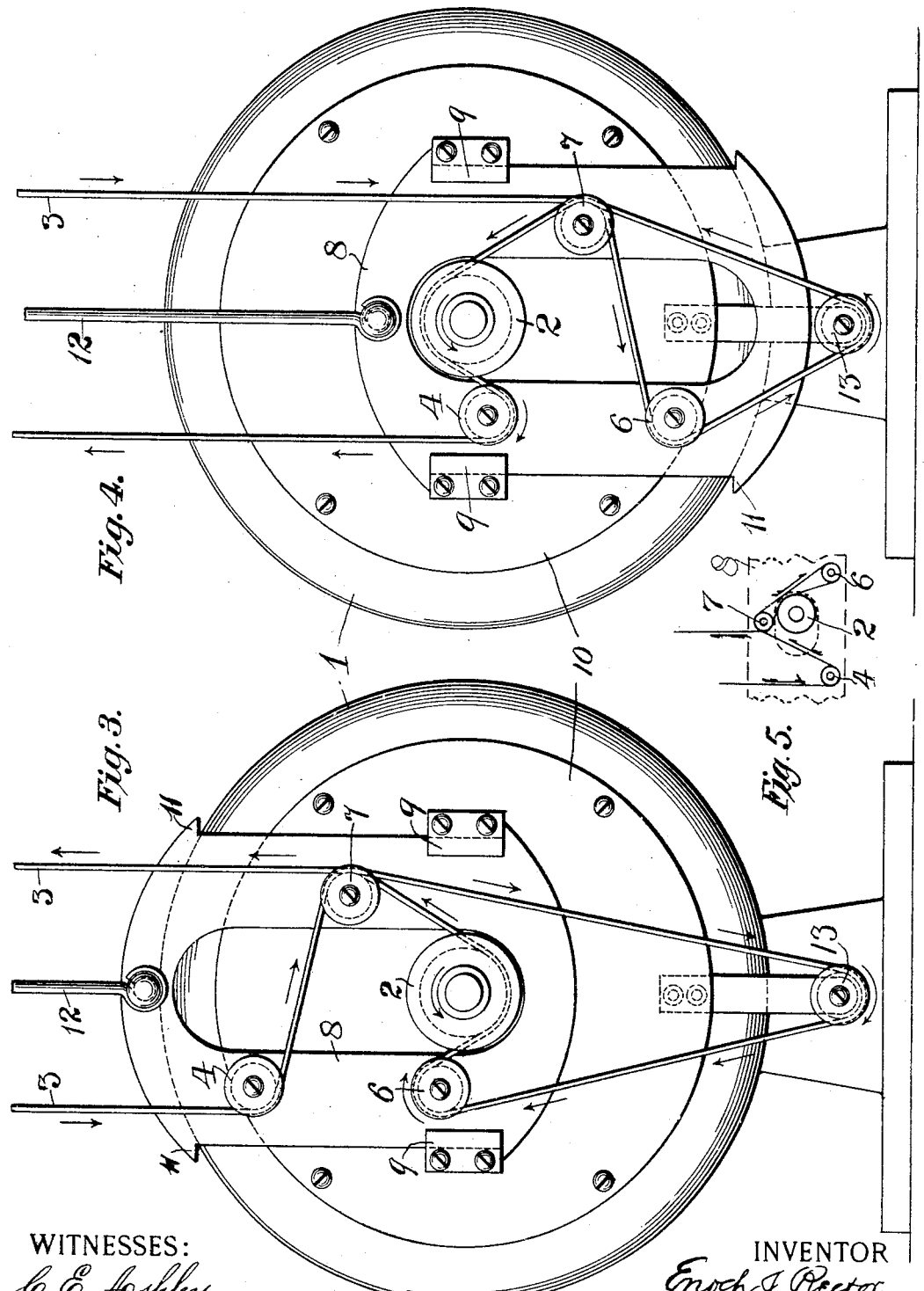
WITNESSES:
C. E. Ashley
Gus. C. Henning
INVENTOR
Enoch J. Rector,
By his Attorney,
Richard W. Barkley.

No. 784,705.

Patented March 14, 1905.

UNITED STATES PATENT OFFICE.

ENOCH J. RECTOR, OF PARKERSBURG, WEST VIRGINIA.

REVERSING DRIVING MECHANISM.

SPECIFICATION forming part of Letters Patent No. 784,705, dated March 14, 1905.

Application filed September 26, 1902. Renewed June 10, 1904. Serial No. 211,898.

*To all whom it may concern:*

Be it known that I, ENOCH J. RECTOR, a citizen of the United States, and a resident of Parkersburg, in the county of Wood and State of West Virginia, have invented a certain new and useful Improvement in Reversing Driving Mechanism, of which the following is a specification.

The present invention relates to means for reversing the direction of motion of a driven member from a driver member which moves progressively or always in one direction.

In its essential features the invention consists of a rotatory wheel or pulley combined with four guide pulleys or wheels located two at one side and two at the other side of the said wheel or pulley, a shifter for causing relative motion of the first-mentioned wheel or pulley and the guide pulleys or wheels, and a belt or cord on said guide-pulleys and passing back and forth from side to side of the first-mentioned wheel or pulley and on opposite sides thereof, whereby the said belt or cord makes non-simultaneous contact with the first-mentioned wheel or pulley at opposite sides thereof, according to the position of the shifter and the part or parts carried or moved by the same. The belt or cord leads away from guide pulleys or wheels at opposite sides of the first-mentioned wheel or pulley, and if the shifting motion is in the same direction as or is substantially parallel to said leading-away direction there is a fifth guide pulley or wheel at a fixed distance from the first-mentioned wheel or pulley and about which the belt or cord also passes, the object of the fifth guide pulley or wheel being to prevent any slackening of the belt or cord during the shift; but if the shifting motion is at right angles, or nearly so, to the said leading-away direction then such fifth pulley is omitted.

The invention is illustrated in the accompanying drawings, forming part hereof, in which—

Figure 1 is a side elevation, and Fig. 2 a front view, of one embodiment, the parts being in a neutral position and one guide being omitted in order to clearly show a part behind it. Figs. 3 and 4 are front views of the same, showing the parts in different working positions; and Fig. 5 is a view showing a modified arrangement.

In the drawings the reference 1 designates a motor which drives wheel or pulley 2 in one direction only, and 3 is a cord or belt which in the instances shown is driven by the wheel 2. Belt 3 passes about guide pulleys or wheels 4 5 6 7 in the order named, said guide-pulleys being suitably journaled on stud-screws which engage with threaded holes in a plate 8, which is shiftable in guides 9, attached to a plate 10, which in turn is attached to the motor-frame. The plate 8 has ears 11 thereon, which coact with the guides 9 to limit the motion of the plate 8, and 12 is a rod connected with and controlling the position of the plate 8 when the apparatus is in use. The guide-pulleys 5 and 7 are conveniently mounted side by side on one stud. These pulleys 5 and 7 turn in opposite directions. The belt 3 leads away from the pulleys 4 and 7 in a direction substantially parallel in Figs. 1 to 4 with the direction of motion of the plate 8 and in a direction substantially at right angles in Fig. 5 to the direction of motion of said plate 8. In the instance illustrated in Figs. 1 to 4 in order to prevent undue slackening of the belt 3 during the operation of shifting there is provided a guide-pulley 13 at a fixed distance from the wheel 2, and the belt or cord 3 passes from pulley 5 about pulley 13 and thence to pulley 6.

With the wheel 2 acting as a driver and moving always in one direction the operation of the parts is illustrated by Figs. 3 and 4, wherein the arrows indicate the direction of motion of the parts alongside of which they are placed.

What I claim as new, and desire to secure by Letters Patent of the United States, is—

1. The combination with a rotary drive wheel or pulley, of four guide pulleys or wheels located at opposite sides of said drive-wheel, a belt or cord passing about said guide-pulleys and on opposite sides of the drive-wheel and in contact therewith at one side only, and a shifter for causing relative motion of said drive and guide wheels, whereby the cord or belt may be caused to engage with the drive-wheel at either side thereof.

2. The combination with a rotatory wheel or pulley, of a plurality of guide wheels or pulleys located some at one and some at the other side of said rotatory wheel or pulley, a belt or cord passing about said guide wheels or pulleys at opposite sides of and in contact with one side of said rotatory wheel or pulley, and means for causing relative motion of said rotatory wheel or pulley and said guide wheels or pulleys, whereby the belt or cord may be caused to engage with either side of the rotatory wheel or pulley.

3. The combination with a rotatory wheel, of four guide-wheels located two at one side and two at the other side thereof, a belt or cord passing about said guide wheels or pulleys and on opposite sides of the said rotatory wheel or pulley and in contact with the said rotatory wheel at one side thereof, a fifth guide-wheel at a fixed distance from the said rotatory wheel, and a shifter for causing relative motion of said rotatory and said guide wheels in a direction substantially parallel to a line through the fifth guide-wheel and the rotatory wheel.

Signed at Parkersburg, in the county of Wood and State of West Virginia, this 17th day of September, A. D. 1902.

ENOCH J. RECTOR.

Witnesses:
G. H. T. GREER,
URBAN T. THOMPSON.